US011336619B2

(12) United States Patent
Martz et al.

(10) Patent No.: US 11,336,619 B2
(45) Date of Patent: *May 17, 2022

(54) HOST PROCESS AND MEMORY SEPARATION (71) Applicant: L3 Technologies, Inc., New York, NY (US)

(72) Inventors: Peter Martz, Marlton, NJ (US); Kenneth Moritz, Lansdowne, PA (US); Glenn Coleman, Berwyn, PA (US)

(73) Assignee: L3 Technologies, Inc., New York, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/144,761

(22) Filed: Sep. 27, 2018

(65) Prior Publication Data

US 2019/0097975 A1    Mar. 28, 2019

Related U.S. Application Data (60) Provisional application No. 62/564,922, filed on Sep. 28, 2017.

(51) Int. Cl.
H04L 29/06 (2006.01)
G06F 21/53 (2013.01)
G01S 5/02 (2010.01)
H04W 4/02 (2018.01)
H04L 41/0803 (2022.01)
(Continued)

(52) U.S. Cl.
CPC ........ *H04L 63/0263* (2013.01); *G01S 5/0284* (2013.01); *G06F 21/53* (2013.01);
(Continued)

(58) Field of Classification Search
CPC ............. H04W 12/0808; H04W 4/023; H04W 12/00503; H04L 41/0803; H04L 63/0853;
(Continued)

(56) References Cited

U.S. PATENT DOCUMENTS 7,150,040 B2   12/2006 Brownell
7,467,408 B1   12/2008 Otoole, Jr.
(Continued)

FOREIGN PATENT DOCUMENTS

RU    2406138 C1    12/2010

OTHER PUBLICATIONS

Barnet, Mark, "Praktikum Po Zaschite Seti Kompanii", Windows IT Pro/RE, Nov.-Dec. 2006, 4 pages.
(Continued)

Primary Examiner — Tri M Tran
(74) Attorney, Agent, or Firm — Condo Roccia Koptiw LLP (57) ABSTRACT A host computer system may be configured to connect to a network. The host computer system may be configured to implement a workspace, an isolated computing environment, and a host-based firewall. The host computer system may be configured to isolate the isolated computing environment from the workspace using an internal isolation firewall. The internal isolation firewall may be configured to prevent data from being communicated between the isolated computing environment and the workspace, for example, without an explicit user input. The host computer system may be configured to determine, using one or more environmental indicators, a relative location of the host computer system. The processor may be configured to select a firewall policy based on the relative location of the host computer system. The firewall policy may include a configuration to apply to one or more of the internal isolation firewall or the host-based firewall.

20 Claims, 6 Drawing Sheets (51) Int. Cl.
*H04W 12/63* (2021.01)
*H04W 12/088* (2021.01)
*H04L 43/0817* (2022.01)
*G01S 19/38* (2010.01)

(52) U.S. Cl.
CPC ...... *H04L 41/0803* (2013.01); *H04L 63/0281* (2013.01); *H04L 63/0853* (2013.01); *H04L 63/20* (2013.01); *H04W 4/023* (2013.01); *H04W 12/088* (2021.01); *H04W 12/63* (2021.01); *G01S 5/02* (2013.01); *G01S 19/38* (2013.01); *G06F 2221/2149* (2013.01); *H04L 43/0817* (2013.01)

(58) Field of Classification Search
CPC . H04L 63/0281; H04L 43/0817; H04L 63/20; H04L 63/0263; G06F 2221/2149; G06F 21/53; G01S 5/02; G01S 19/38; G01S 5/0284
See application file for complete search history.

(56) References Cited

U.S. PATENT DOCUMENTS

| | | |
|---|---|---|
| 7,478,330 B1 | 1/2009 | Branson et al. |
| 7,694,328 B2 | 4/2010 | Joshi et al. |
| 7,698,442 B1 | 4/2010 | Krishnamurthy et al. |
| 7,716,720 B1 | 5/2010 | Marek et al. |
| 7,805,516 B2 | 9/2010 | Kettler et al. |
| 7,870,153 B2 | 1/2011 | Croft et al. |
| 7,926,086 B1 | 4/2011 | Violleau et al. |
| 8,090,797 B2 | 1/2012 | Chinta et al. |
| 8,539,561 B2 | 9/2013 | Pingali et al. |
| 8,566,398 B2 | 10/2013 | Barnier et al. |
| 8,613,070 B1 | 12/2013 | Borzycki et al. |
| 8,769,268 B2 | 7/2014 | Morozov et al. |
| 8,832,833 B2 | 9/2014 | Demopoulos et al. |
| 8,931,054 B2 | 1/2015 | Huynh et al. |
| 8,966,464 B1 | 2/2015 | Christopher et al. |
| 9,294,492 B1 | 3/2016 | Martini et al. |
| 9,386,021 B1 | 7/2016 | Pratt |
| 9,438,634 B1 | 9/2016 | Ross et al. |
| 9,465,734 B1 | 10/2016 | Myrick et al. |
| 9,531,715 B1 | 12/2016 | Rodgers et al. |
| 9,560,081 B1 | 1/2017 | Woolward |
| 9,602,524 B2 | 3/2017 | Ghosh et al. |
| 9,609,026 B2 | 3/2017 | Ross et al. |
| 9,680,873 B1 | 6/2017 | Halls et al. |
| 9,729,579 B1 | 8/2017 | Marino et al. |
| 9,787,639 B1 | 10/2017 | Sun et al. |
| 9,864,600 B2 | 1/2018 | Larimore et al. |
| 9,921,860 B1 | 3/2018 | Banga et al. |
| 9,942,198 B2 | 4/2018 | Hoy et al. |
| 10,037,199 B2 | 7/2018 | Hung et al. |
| 10,055,231 B1 | 8/2018 | Li et al. |
| 10,122,703 B2 | 11/2018 | Innes et al. |
| 10,375,111 B2 | 8/2019 | Schultz et al. |
| 10,397,273 B1 | 8/2019 | Stickle et al. |
| 10,521,612 B2 | 12/2019 | Arad et al. |
| 10,554,475 B2 | 2/2020 | Weinstein et al. |
| 10,558,798 B2 | 2/2020 | Weinstein et al. |
| 10,873,589 B2 | 12/2020 | Cheetancheri et al. |
| 2002/0023212 A1 | 2/2002 | Proudler |
| 2002/0040439 A1 | 4/2002 | Kellum |
| 2002/0069366 A1 | 6/2002 | Schoettger |
| 2002/0069369 A1 | 6/2002 | Tremain et al. |
| 2005/0144467 A1* | 6/2005 | Yamazaki ............. H04L 63/104 713/189 |
| 2006/0070066 A1 | 3/2006 | Grobman |
| 2006/0282795 A1 | 12/2006 | Clark et al. |
| 2007/0136579 A1 | 6/2007 | Levy et al. |
| 2007/0220187 A1 | 9/2007 | Kates |
| 2007/0260873 A1 | 11/2007 | Hatfalvi et al. |
| 2008/0016313 A1 | 1/2008 | Murotake et al. |
| 2008/0028401 A1 | 1/2008 | Geisinger |
| 2008/0201711 A1 | 8/2008 | Amir Husain |
| 2008/0256536 A1 | 10/2008 | Zhao et al. |
| 2009/0164994 A1 | 6/2009 | Vasilevsky et al. |
| 2009/0172781 A1 | 7/2009 | Masuoka et al. |
| 2009/0249472 A1 | 10/2009 | Benjamini et al. |
| 2009/0265760 A1 | 10/2009 | Zhu et al. |
| 2009/0328038 A1 | 12/2009 | Yamada et al. |
| 2010/0138829 A1 | 6/2010 | Hanquez et al. |
| 2010/0138830 A1 | 6/2010 | Astete et al. |
| 2010/0217916 A1 | 8/2010 | Gao et al. |
| 2010/0223613 A1 | 9/2010 | Schneider |
| 2010/0251329 A1 | 9/2010 | Wei |
| 2011/0154431 A1 | 6/2011 | Walsh |
| 2011/0299515 A1 | 12/2011 | Robertson et al. |
| 2012/0017213 A1 | 1/2012 | Hunt et al. |
| 2012/0023593 A1 | 1/2012 | Puder et al. |
| 2012/0054744 A1 | 3/2012 | Singh et al. |
| 2012/0265976 A1 | 10/2012 | Spiers et al. |
| 2012/0266149 A1 | 10/2012 | Lebert |
| 2013/0132948 A1 | 5/2013 | Hari et al. |
| 2013/0145463 A1 | 6/2013 | Ghosh et al. |
| 2013/0318594 A1* | 11/2013 | Hoy ..................... G06F 21/53 726/15 |
| 2014/0040979 A1 | 2/2014 | Barton et al. |
| 2014/0059642 A1 | 2/2014 | Deasy et al. |
| 2014/0075535 A1 | 3/2014 | Soffer et al. |
| 2014/0108558 A1 | 4/2014 | Borzycki et al. |
| 2014/0115646 A1 | 4/2014 | Rajgopal et al. |
| 2014/0282890 A1 | 9/2014 | Li et al. |
| 2014/0344912 A1 | 11/2014 | Chapman, II et al. |
| 2014/0351516 A1 | 11/2014 | Larimore et al. |
| 2014/0380403 A1 | 12/2014 | Pearson et al. |
| 2015/0058923 A1 | 2/2015 | Rajagopal et al. |
| 2015/0106822 A1 | 4/2015 | Lei |
| 2015/0143374 A1 | 5/2015 | Banga et al. |
| 2015/0156203 A1 | 6/2015 | Giura et al. |
| 2015/0161277 A1 | 6/2015 | Heller et al. |
| 2015/0248554 A1 | 9/2015 | Dumitru et al. |
| 2015/0281176 A1 | 10/2015 | Banfield |
| 2016/0057167 A1 | 2/2016 | Bach |
| 2016/0134549 A1 | 5/2016 | Abel et al. |
| 2016/0226834 A1 | 8/2016 | Dawson |
| 2016/0246974 A1 | 8/2016 | Broz et al. |
| 2016/0248754 A1 | 8/2016 | Jahr |
| 2016/0292694 A1* | 10/2016 | Goldschlag ......... H04L 63/0272 |
| 2017/0034174 A1 | 2/2017 | Jägers |
| 2017/0076092 A1 | 3/2017 | Kashyap et al. |
| 2017/0142144 A1 | 5/2017 | Weinberger et al. |
| 2017/0180413 A1 | 6/2017 | Petry et al. |
| 2017/0206351 A1 | 7/2017 | Jay et al. |
| 2017/0208067 A1 | 7/2017 | Sriramakrishnan |
| 2017/0250997 A1 | 8/2017 | Rostamabadi et al. |
| 2017/0293432 A1 | 10/2017 | Oldcorn et al. |
| 2017/0317978 A1* | 11/2017 | Diaz-Cuellar ...... H04L 63/0272 |
| 2017/0353496 A1* | 12/2017 | Pai ..................... H04L 63/1441 |
| 2017/0359309 A1 | 12/2017 | Bolte et al. |
| 2018/0027006 A1 | 1/2018 | Zimmermann et al. |
| 2018/0115519 A1 | 4/2018 | Bonomi et al. |
| 2018/0139178 A1 | 5/2018 | Gan |
| 2018/0196945 A1 | 7/2018 | Kornegay et al. |
| 2018/0198824 A1 | 7/2018 | Pulapaka et al. |
| 2018/0203995 A1 | 7/2018 | Yuen et al. |
| 2018/0234422 A1 | 8/2018 | Odom et al. |
| 2018/0276396 A1 | 9/2018 | Yablokov et al. |
| 2018/0330257 A1 | 11/2018 | Dodson et al. |
| 2018/0367528 A1 | 12/2018 | Schwarz et al. |
| 2019/0097970 A1 | 3/2019 | Coleman et al. |
| 2019/0097972 A1 | 3/2019 | Coleman et al. |
| 2019/0098020 A1 | 3/2019 | Martz et al. |
| 2019/0121962 A1 | 4/2019 | Coleman et al. |
| 2019/0213325 A1 | 7/2019 | Mckerchar et al. |

OTHER PUBLICATIONS

Burnett, Mark, "How I Secured One Company's Network", Using Log Parser, Virtualization, and A Little Psychology, Sep. 17, 2006, 4 pages.

(56) References Cited

OTHER PUBLICATIONS

Laverick, Mike, "Hypervisor Management and Optimization for Advanced Virtualization", Advanced Virtualization E-Book, 2010, 13 pages.
Li et al., "VSITE: A Scalable and Secure Architecture for Seamless L2 Enterprise Extension in the Cloud", 6th IEEE Workshop on Secure Network Protocols, Kyoto, Oct. 2010, pp. 31-36.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at https://en.wikipedia.org/wiki/Hypervisor, retrieved on Dec. 2010, 6 pages.
Wikipedia, "Internet Protocol", Available at https://en.wikipedia.org/wiki/Internet_Protocol, retrieved on Dec. 2010, 5 pages.
Wikipedia, "Multiprotocol Label Switching", Available at https://en.wikipedia.org/wiki/Muitiprotocol_Label_Switching, retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010, 9 pages.
"NPL Search Term", Web Search History, 1 page.
Azab, et al., "SICE: A Hardware-Level Strongly Isolated Computing Environment for x86 Multi-Core Platforms", Proceedings of the 18th ACM Conference on Computerand Communications Security, Oct. 2011, pp. 375-388.
Bruckman, et al., ""Georgia Computes!": Improving the Computing Education Pipeline", Proceeding of the 40th ACM Technical Symposium on Computer Science Education, 2009, pp. 86-90.
Comodo "Comodo Internet Security", Software Version 7.0, User Guide Version 7.0.111114, 2014, pp. 1-579.
Gupta, et al., "A Secure Architecture Design Based on Application Isolation, Code Minimization and Randomization", IEEE 6th Symposium on Security Analytics and Automation 2013, 2013, pp. 423-429.
Haq, et al., "Design and Implementation of Sandbox Technique for Isolated Applications", IEEE School of Computer Science and Technology, Beijing Institute of Technology, Beijing, China, 2016, pp. 557-561.
Hsu, et al., "Enforcing Least Privilege Memory Views for Multithreaded Applications", Proceedings of the 2016 ACM SIGSAC Conference on Computer and Communications Security, Oct. 2016, pp. 393-405.
Jauernig, et al., "Trusted Execution Environments: Properties, Applications, and Challenges", IEEE Computer and Reliability Societies, Resilient Security, Mar.-Apr. 2020, pp. 56-60.
Jung, et al., "An Architecture for Virtualization-Based Trusted Execution Environment on Mobile Devices", 2014 IEEE 11th International Conference on Ubiquitous Intelligence and Computing and 2014 IEEE 11th International Conference on Autonomic and Trusted Computing and 2014 IEEE 14th International Conference on Scalable Computing and Communications and, Associated Symposia/Workshops, 2014, pp. 540-547.
Kostiainen, et al., "Dedicated Security Chips in the Age of Secure Enclaves", IEEE Computerand Reliability Societies; Hardware-Assisted Security, Sep.-Oct. 2020, pp. 38-46.
Le, et al., "Computing the Real Isolated Points of an Algebraic Hypersurface", International Symposium on Symbolic and Algebraic Computation, Aug. 24, 2020, 12 pages.
Liu, et al., "Thwarting Memory Disclosure with Efficient Hypervisor-Enforced Intra-Domain Isolation", Proceedings of the 22nd ACM SIGSAC Conference on Computer and Communications Security, Oct. 2015, pp. 1607-1619.
Srivastava, et al., "Tamper-Resistant, Application-Aware Blocking of Malicious Network Connections", School of Computer Science, Georgia Institute of Technology, 2008, pp. 39-58.
Yadav, et al., "Impact & Analysis of Virtual Workspace on Grid Computing", International Journal of Science & Technology (IJST), vol. 2, Issue 2, Apr. 2012, pp. 24-32.
Yee, et al., "Native Client: A Sandbox for Portable, Untrusted x86 Native Code", 2009 30th IEEE Symposium on Security and Privacy, 2009, pp. 79-93.
Chen, Yaohui et al., "Shreds: Fine-Grained Execution Units", 2016 IEEE Symposium on Security and Privacy, 2016, pp. 1-16.
Evtyushkin, Dmitry et al., "ISO-X: A Flexible Architecture for Hardware-Managed Isolated Execution", 2014 47th Annual IEEE/ACM International Symposium on Microarchitecture, 2014, pp. 1-13.
Mambretti, Andrea et al., "Trellis: Privilege Separation for Multi-User Applications Made Easy", 2016, pp. 1-20.

* cited by examiner

HOST PROCESS AND MEMORY SEPARATION

CROSS-REFERENCE TO RELATED APPLICATIONS

This application claims the benefit of U.S. Provisional Patent Application No. 62/564,922, filed Sep. 28, 2017, the contents of which is hereby incorporated by reference in its entirety.

BACKGROUND

Computer systems are designed to execute software applications and processes. While most of these applications are innocuous, some applications, traditionally referred to as malware, are harmful. These malware applications compromise computer systems and render them unsafe for use. The malware applications may even attempt to exfiltrate sensitive information. Many existing solutions to preventing malware, such as hardware-based firewalls, attempt to block the malware from ever reaching the computing systems that reside behind the firewalls. Elaborate defensive protections are implemented which are often costly and difficult to maintain. Unfortunately, even with these defensive systems in place, many malware applications still reach the computer systems and networks lying behind the firewall.

SUMMARY

Methods and systems are disclosed for instantiating a host-based firewall, selecting an appropriate firewall policy (e.g., based on location), and/or providing an isolated computing environment with segregated processes and/or memory space. A host computer system may be configured to connect to a network. The host computer system may include a memory and a processor. The processor may be configured to implement a workspace and an isolated computing environment. The workspace may be configured to enable operation of a first set of one or more applications or processes via a first memory space. The isolated computing environment may be configured to enable operation of a second set of one or more applications or processes via a second memory space. The processor may be configured to communicate, using the second set of one or more applications or processes operating on the isolated computing environment, with untrusted network destinations via a proxy device. The processor may be configured to isolate the isolated computing environment from the workspace using an internal isolation firewall. The isolated computing environment may be configured to authenticate with an authorization device. The isolated computing environment may be a sandboxed computing environment enforced by a sandbox container process that enables the internal isolation firewall. The internal isolation firewall may be configured to prevent data from being communicated between the isolated computing environment and the workspace, for example, without an explicit user input. The internal isolation firewall may be configured to allow a predetermined set of programs and processes to operate within the isolated computing environment. The processor may be configured to prevent (e.g., using a host-based firewall) communication between the host computer system and one or more other devices on the network.

The processor may be configured to determine, using one or more environmental indicators, a relative location of the host computer system. The environmental indicators may include an internet protocol (IP) address assigned to the host computer system, the network to which the host computer system is connected, a network identifier, a router to which the host computer system is connected, a border firewall to which the host computer system is connected, available wired or wireless connections, an indication of latitude and longitude coordinates for the host computer system from a global positioning system (GPS) radio, and/or a triangulated position of the host computer system based on wireless signals received. The processor may be configured to select a firewall policy based on the relative location of the host computer system. The firewall policy may include a configuration to apply to one or more of the internal isolation firewall or the host-based firewall. The processor may be configured to implement a monitoring process. The monitoring process may monitor the internal isolation firewall to identify when the internal isolation firewall is not operating or abnormal operation of the internal isolation firewall.

When the relative location of the host computer system is a known network, the firewall policy may be a preconfigured firewall policy associated with the known network. When the relative location of the host computer system is an unknown network, the firewall policy is a default firewall policy associated with unknown networks. The default firewall policy may include the host-based firewall being configured to block incoming and outgoing traffic from the workspace of the host computer system.

The processor may be configured to receive a request to transfer data from the workspace to the isolated computing environment. When the request is initiated by a user of the host computer system and is a permitted action, the processor may be configured to allow the transfer of the data to the isolated computing environment. When the request is non-user initiated and/or is not a permitted action, the processor may be configured to block the transfer of the data to the isolated computing environment.

The processor may be configured to receive a request to transfer data from the isolated computing environment to the workspace. When the request is initiated by a user of the host computer system and is a permitted action, the processor may be configured to allow the transfer of the data to the workspace. When the request is non-user initiated or is not a permitted action, the processor may be configured to block the transfer of the data to the workspace.

DETAILED DESCRIPTION

Embodiments described herein are directed to instantiating a host-based firewall, selecting an appropriate firewall policy based on location, and are further directed to providing an isolated computing environment (e.g., such as a protected sandbox environment) with segregated processes and memory space. A host computer system instantiates an isolated computing environment (e.g., a sandbox environment) configured to run at least one process. The host computer system determines, based on various environmental indicators, a relative location of the host computer system. Based on the relative location of the host computer system, a location-specific firewall policy is selected for a sandbox firewall and/or a host-based firewall. The host computer system then instantiates a sandbox (or "software-based") firewall and/or a host-based firewall according to the selected location-specific firewall policy. The sandbox firewall is configured to enforce separation between the sandbox environment and the remaining memory space, including the operating system, of the host computer system. The host-based firewall is configured to enforce separation between the host computer system and the network to which it is connected.

A host computer system provides a protected sandbox environment with segregated processes and memory space. The host computer system instantiates a sandbox environment, which is configured to run various processes. The host computer system instantiates an internal isolation firewall (e.g., a sandbox (or "software-based") firewall) configured to enforce separation between the sandbox environment and the remaining memory space, including the operating system, of the host computer system. This separation includes limiting or preventing data transfer between the sandbox environment and the remaining memory space, including the operating system, of the host computer system.

The host computer system or the sandbox firewall then determines that a data transfer has been requested between a process in the sandbox environment and the remaining memory space, including the operating system, of the host computer system. In response to the request, the host computer system or sandbox firewall either determines that the request is not user-initiated, and blocks the data transfer, or, determines that the request to transfer data between the process in the sandbox environment and the remaining memory space, including the operating system, of the host computer system is user-initiated, and allows the data transfer to occur. In additional or alternative embodiments, the host computer system or sandbox firewall may also determine whether the data transfer is a permitted action. In such cases, if the data transfer is both user-requested and is a permissible action, the data transfer may be allowed to execute. Otherwise, the data transfer is blocked.

Thus, in the embodiments herein, if a malware application was able to penetrate a host computer system operating system, and attempted to exit through established firewalls, a web proxy, or some similar network device, traffic (e.g., all traffic) would be dropped from the host computer system operating system. This would include the sandbox firewall, which refuses automated (e.g., all automated) connections from non-sandbox memory space of the host computer system.

The embodiments described herein provide solutions to prevent malware from spreading or causing damage within a network. More specifically, the embodiments herein provide methods and systems that stop automated infiltration of malware from the use of an application such as a web browser. Often, due to the persistence of malware designers, viruses, worms, rootkits or other malicious software eventually makes its way into a network. Still further, user errors such as clicking links in infected emails, visiting infected websites, or providing execution permissions to unsafe applications may introduce malware to a host computer's operating system. The methods and systems described herein reduce the ill effects of the malware once it is within the network. Indeed, the methods and systems herein prevent the spread of malware within the network, and also prevent the malware from communicating outside of the network.

A host computer (or "host computer system") may select an appropriate firewall policy, based on its current location. This firewall policy may dictate whether to provide stronger or weaker protections, based on the location of the host computer system. Secondly, the host computer system may provide a protected sandbox environment with segregated processes and memory space. Within this sandbox environment, communications between processes running in the sandbox and the remaining memory space, including the operating system, of the host computer system are limited to those that are user-requested and are permissible actions. These concepts will be described further below with reference to the Figures.

Figure 1:
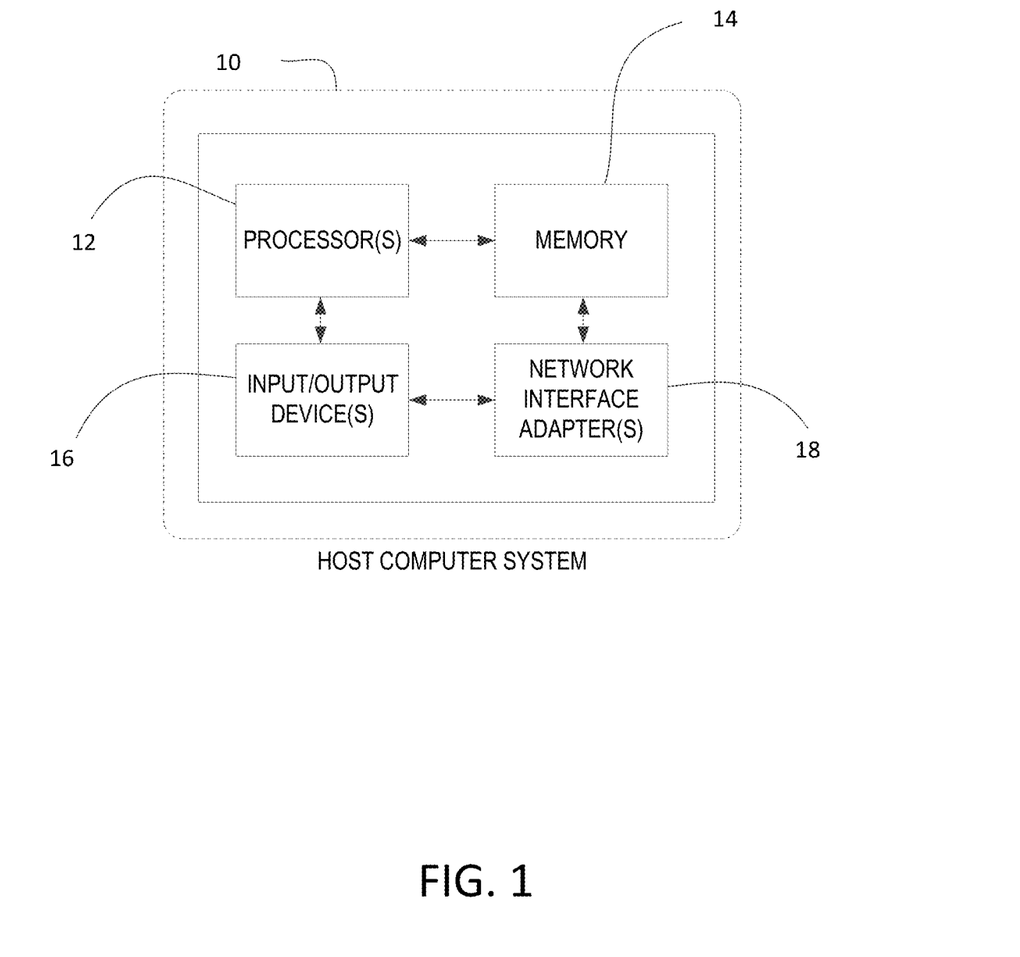
FIG. 1 illustrates an example host computer system.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox-based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/ or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 may allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

Figure 2:
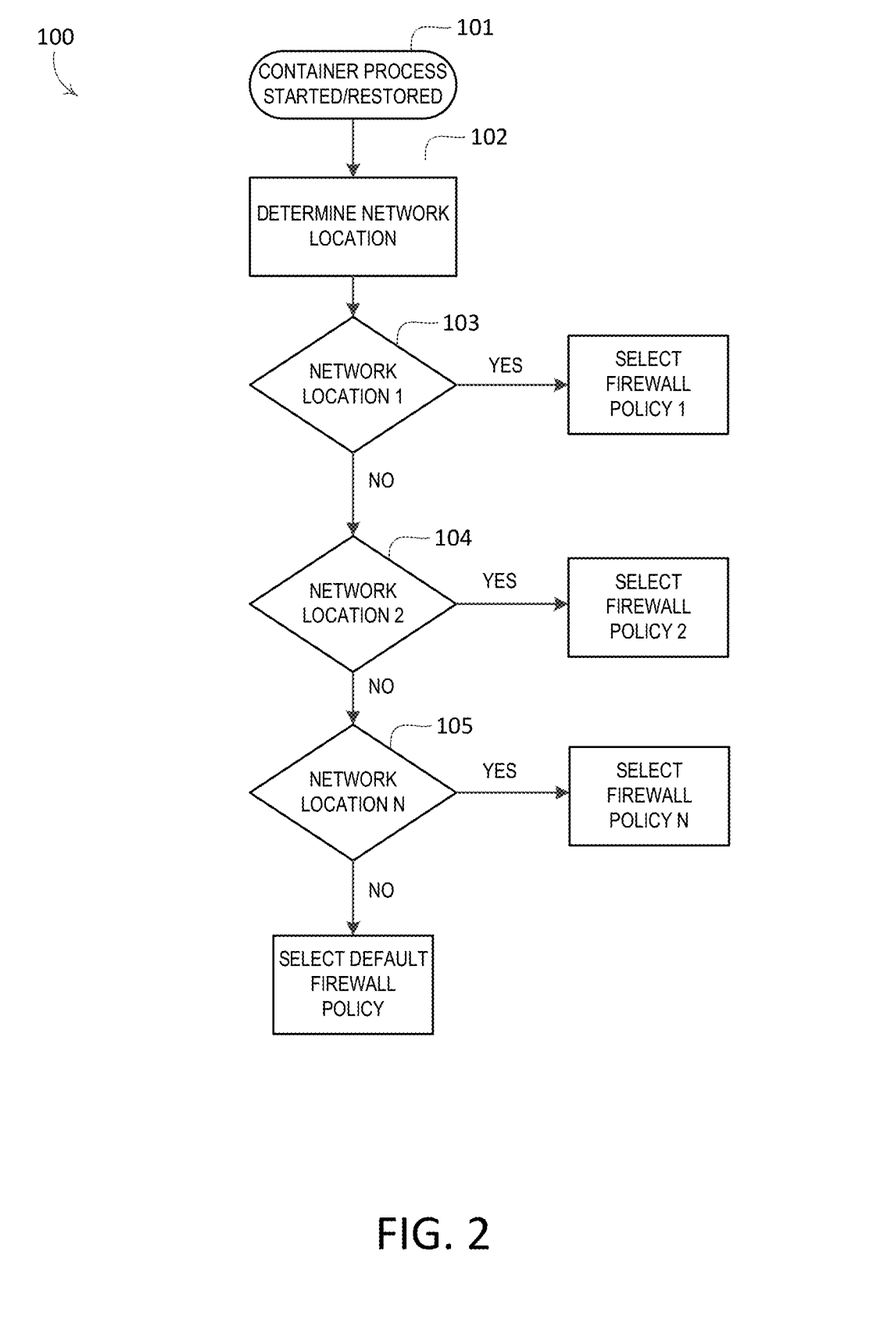
FIG. 2 illustrates a flowchart of an example method for selecting an appropriate firewall policy based on location.
Figure 5:
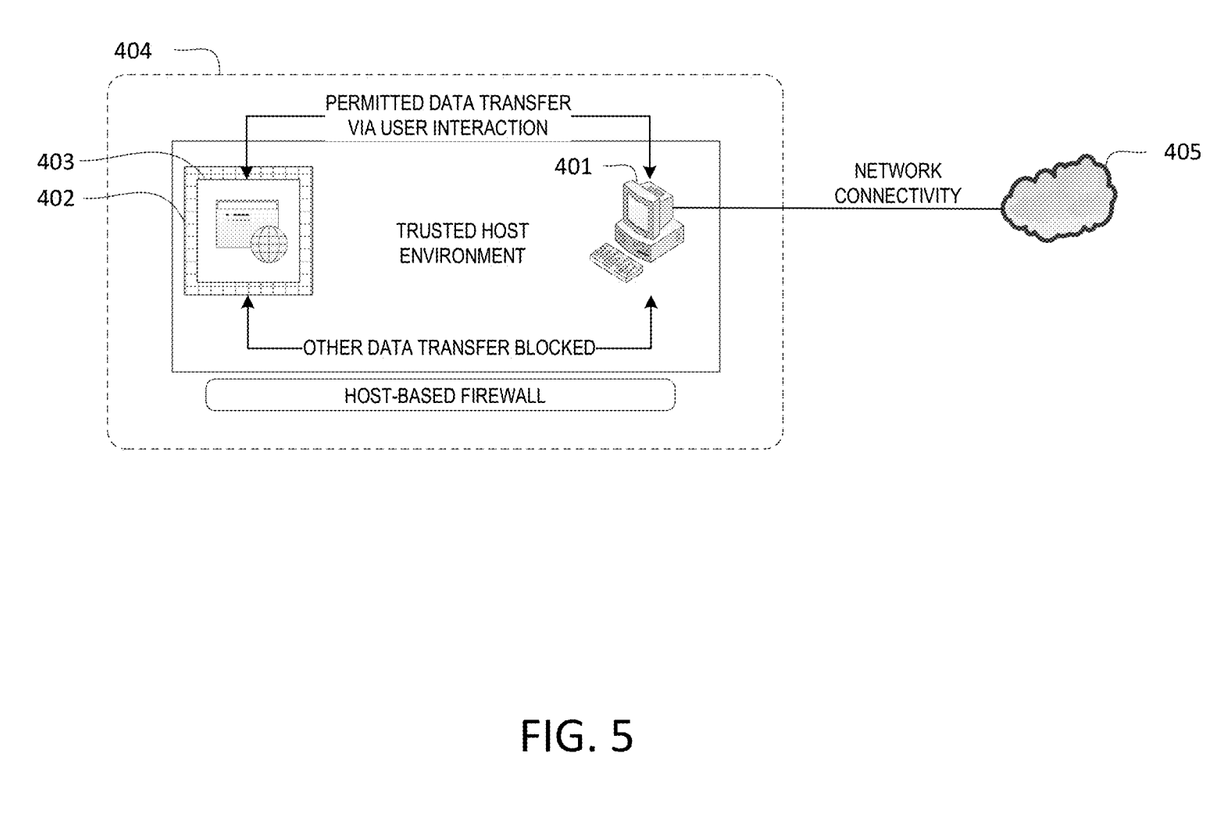
FIG. 5 illustrates an example computer architecture in which embodiments described herein may operate including data transfer between a sandbox environment and non-sandbox memory space of the host computer system.
Figure 6:
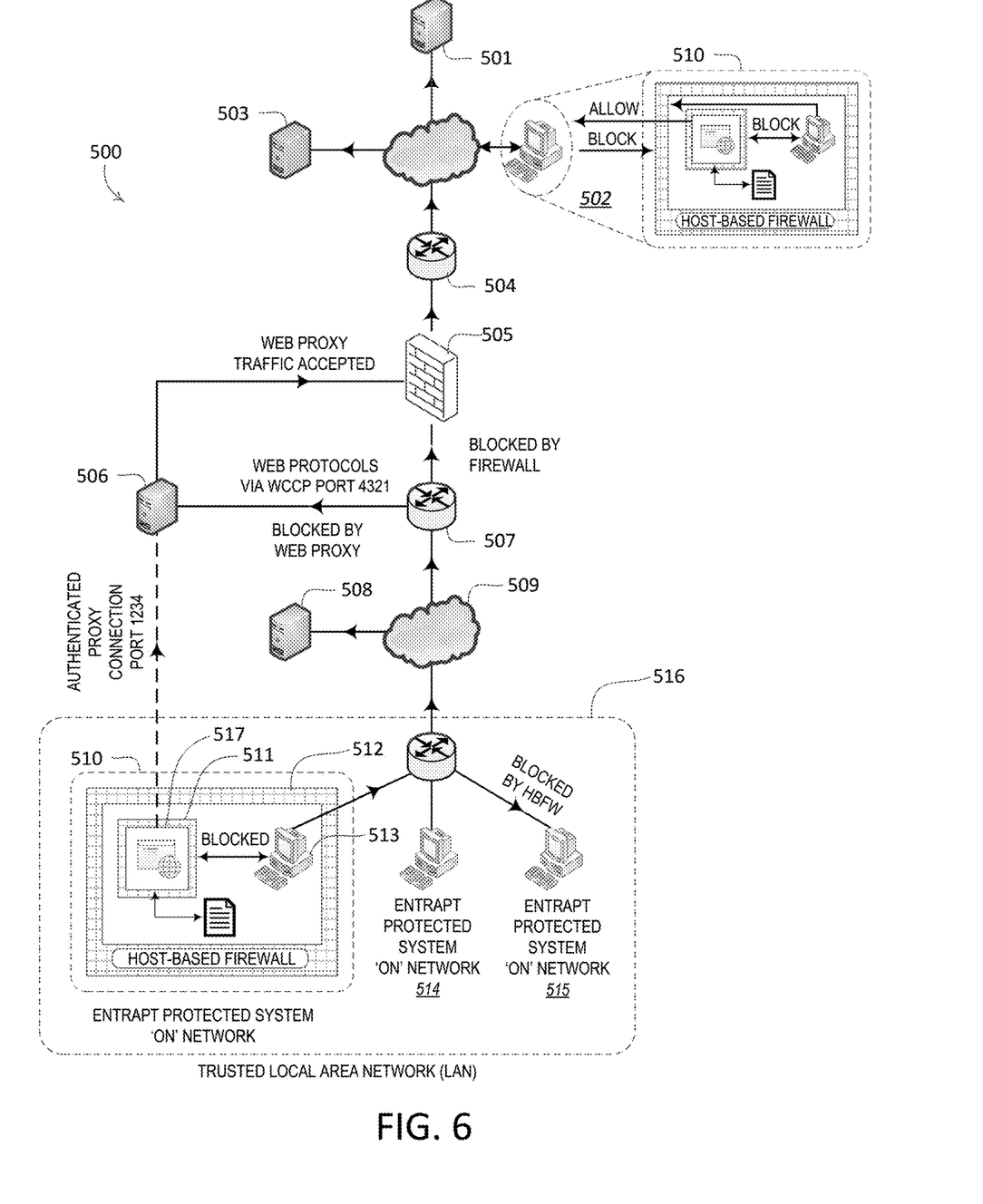
FIG. 6 illustrates another example computer architecture in which embodiments described herein may operate including preventing data exfiltration from a network.

FIG. 2 describes a method 100 implemented at a host computer system (e.g., 404, FIG. 5, and/or 516, FIG. 6). The host computer system may be any type of stationary or mobile computing device, including a PC, laptop, mobile phone, tablet, wearable device or internet of things (JOT) device. As illustrated at 101, the host computer system instantiates a sandbox environment (also referred to as a "container" or simply "sandbox" herein). The sandbox is configured to run at least one process. The sandbox may be started fresh, or may be restored from a previously saved, pristine copy via user interaction, a specified time interval, or if the currently running sandbox is considered infected, corrupted, or otherwise not performing as configured.

Any communications into or out of the sandbox environment are governed by a sandbox firewall. The sandbox firewall may be thought of additionally or alternatively as a "software-based" firewall (e.g., 402, FIG. 5, and/or 511, FIG. 6), meaning a firewall installed to essentially surround and govern the in/out-bound communications of one or more applications (software) and the container. Thus, a sandbox or software-based firewall may be distinguished in examples from an operating system firewall (or "host-based" firewall) in that the sandbox firewall is meant to regulate the sandbox itself, applications operating within the sandbox environments (sandboxed applications), and/or interactions of sandboxed applications and applications running in non-sandbox memory space or in other, different sandbox environment(s).

Meanwhile, the host-based firewall governs (or serves as a barrier to) activity between any application on the host computer system (whether in or out of a sandbox) and the network to which it is connected (also referred to as "the network"). The host-based firewall may be implemented using software that is, at least in some cases, commercially available such as that provided by SYMANTEC or MCAFEE. The host-based firewall may also or alternatively be implemented using software built into the operating system of the host computer system. Additionally or alternatively, the host-based firewall may be implemented using software that configures and/or implements restrictive ingress and/or egress policies on the host computer system.

In examples one or more perimeter firewalls may be included, such as a network firewall (also referred to as a border firewall) that governs communications, such as at a network router, between the host computer system and other devices on the network. One will appreciate that the term "firewall" may be understood to comprise any combination of software and/or hardware components needed to execute the purposes stated herein.

In any case, the sandbox firewall analyzes each communication attempt in or out of the sandbox and determines whether the communication will be allowed or blocked. In at least one embodiment, the sandbox firewall segregates the sandbox environment from the operating system that is executing the sandbox environment. The sandbox firewall is instantiated in accordance with one or more policies determined by an operating system process or application running on the host computer system. These policies may dictate which settings or configuration options are to be used when instantiating the sandbox firewall.

For example, the host computer system instantiates the sandbox at 101 and then determines its relative location at 102 based on one or more environmental indicators. These environmental indicators may include which internet protocol (IP) address the host was assigned, which network it is connected to based on the network identifier, which router it is connected to, which firewall it is connected to, a determination of which wired or wireless connections are available, an indication of latitude and longitude coordinates from a global positioning system (GPS) radio, a triangulated position of the host based on wireless signals received at WiFi radios, Bluetooth radios, cellular or other radios, or other environmental indicators. In some cases, the host computer system may use speakers to identify sounds, cameras to identify light, darkness or other visual characteristics, gyroscopes to detect movement, or other sensors to detect clues that would hint at a potential location for the host computer system.

Using the determined location of the host computer system, the container may select a location-specific firewall policy at 103. If, for example, the determined location is network location 1 ("Yes" at 103), the container may select firewall policy 1. If the container determines network location 2 ("Yes" at 104), then firewall policy 2 is selected. This process may continue through network location N (at 105)

and, if none of those locations is identified ("No" at 105), then a default firewall policy may be selected. Each location-specific firewall policy may indicate a different configuration and/or settings that are to be applied during operation of the sandbox firewall. Some of these settings may be more or less permissive for certain locations, certain types of network traffic, for certain users, or for certain processes running in the sandbox. Using location-specific firewall policies, a network administrator may be able to fully customize how the sandbox firewall will function in environments with varying levels of trust.

Once the container selects the appropriate location-specific firewall policy, the host computer system instantiates the sandbox firewall (e.g., 402, FIG. 5, and/or 511 FIG. 6) in accordance with the policy. The sandbox firewall enforces separation between the sandbox environment and the remaining memory space, including the operating system, of the host computer system (e.g., 401, FIG. 5, and/or 513, FIG. 6). In addition to controlling communication into and out of the sandbox, the sandbox firewall may be configured to allow (e.g., only allow) specific processes or applications to run within the sandbox environment.

Thus, depending on the location of the host computer system, the sandbox firewall may allow or prevent certain applications or processes from being executed within the sandbox. In this manner, the sandbox firewall is used to prevent malware programs or processes running outside of the sandbox environment from communicating with a command-and-control server or other untrusted device through the sandbox environment. Additionally, the sandbox firewall may prevent malware running within the sandbox environment from communicating with processes running outside of the sandbox on the host computer system or devices on the connected network to which the host computer is connected. This prevents a malware program from "calling home" or infecting other network devices.

Figure 3:
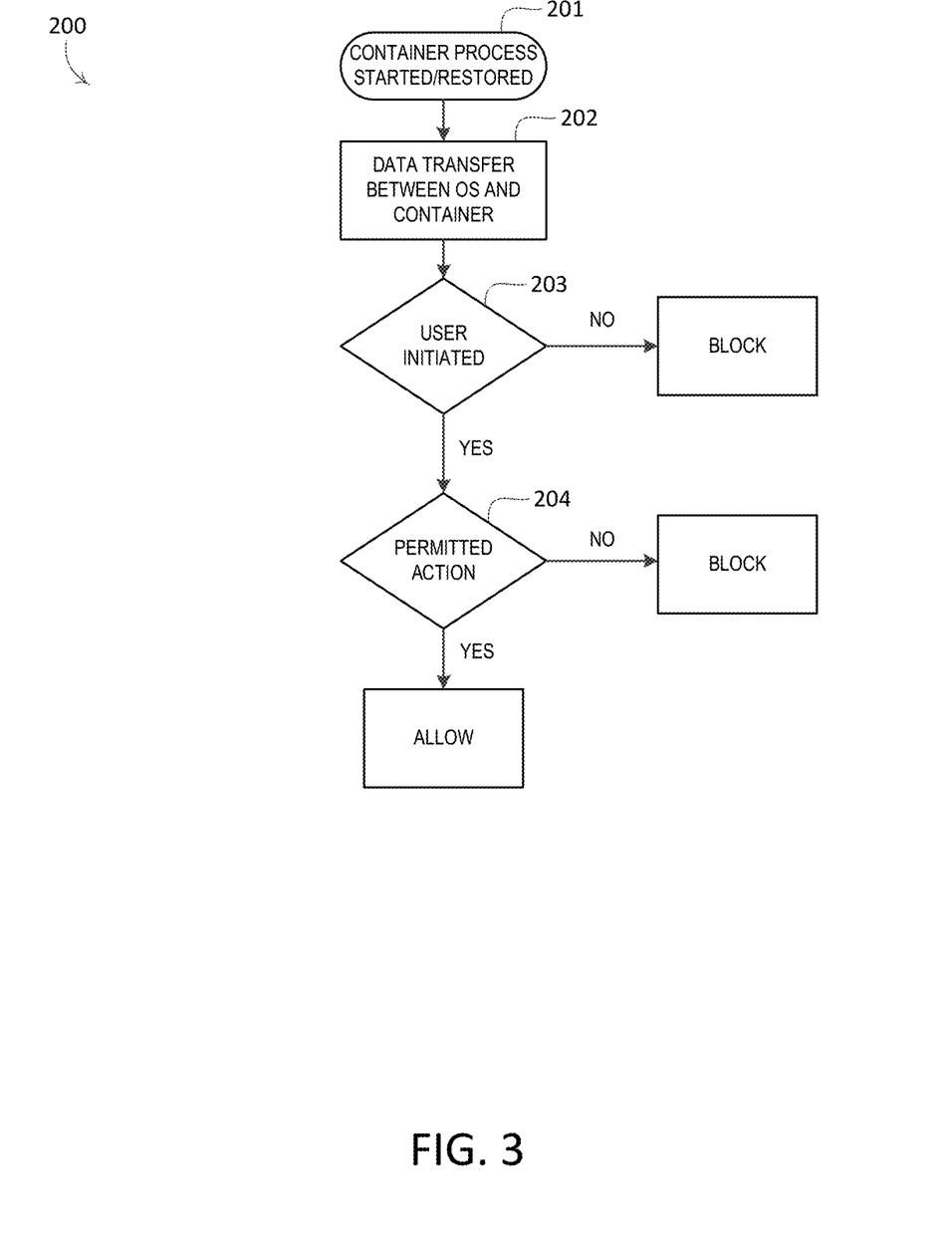
FIG. 3 illustrates a flowchart of an example method for determining whether data transfer is permitted between a sandbox environment and non-sandbox memory space of the host computer system.

FIG. 3 illustrates a method 200 that provides a sandbox environment with segregated processes and memory space within a host computer system. For example, FIG. 3 shows that the method 200 may comprise at 201 instantiating a sandbox environment or container which is configured to run at least one process. Along with the sandbox, the host computer system initializes a sandbox firewall to enforce separation between the sandbox environment and the remaining memory space, including the operating system, of the host computer system. The separation includes limiting or preventing data transfer between the sandbox environment and the remaining memory space, including the operating system, of the host computer system.

Thus, for example, when a data transfer request is received (at 202) at a host computer system indicating that data is to be transferred between a process in the sandbox and the remaining memory space of the host computer system, including the operating system, the sandbox firewall may determine in examples one or more of a couple of responses. In at least one implementation, for example, the sandbox firewall may determine: (i) that the request to transfer data between the process in the sandbox environment and the remaining memory space, including the operating system, of the host computer system is not user-initiated ("No" at 203), and blocks the data transfer. Similarly, the sandbox firewall may determine alternatively: ii) that the request to transfer data is user-initiated ("Yes" at 203) and is a permitted action ("Yes" at 204), and allows the data transfer.

In at least one implementation, if the action is user initiated ("Yes" at 203), but is not a permitted action ("No" at 204), then the sandbox firewall blocks the transfer. Accordingly, any requests to transfer data that are merely application- or process initiated are treated as potential malware requests and are dropped. In at least one implementation, requests (e.g., only requests) that are user-initiated and constitute permissible actions are allowed to proceed through the sandbox firewall.

One will appreciate that the sandbox firewall may be integrated with the operating system of the host computer system. The sandbox firewall may thus be run as an operating system process, under the control of the host computer system's operating system. In other cases, the sandbox firewall may be configured to run as one of the processes in the sandbox environment. Using these two options, a network administrator has greater control over how the sandbox firewall functions, which configurations and settings it uses, and which permissions it has. These may each be changed based on the location, environment and level of trust in each host computer system.

The decision of whether to run the sandbox firewall as a sandbox process or as an operating system process may be tailored to each situation, and may change, for example, if the host computer system changes location or if the level of trust changes for other reasons. Choosing the appropriate firewall settings for a given location ensures that host computer system resources such as CPU cycles and memory are not used unnecessarily in situations where a lower level of security may be feasible.

The sandbox firewall may further enforce separation between the sandbox environment and other, different sandbox environments. For instance, if the host computer system is running multiple sandbox environments, the sandbox firewall may control communications between the first sandbox and any other sandboxes. Additionally or alternatively, each sandbox environment may have its own sandbox firewall. Still further, one sandbox firewall running on the operating system may control multiple (e.g., all) sandbox environments. Again here, a network administrator may have wide latitude to control each sandbox and control how sandbox firewalls are used within the host computer system. The administrator may also initiate a monitoring process that monitors the sandbox firewall(s). This monitoring process ensures that the sandbox firewall(s) remains running, and notifies the administrator if the sandbox firewall is down or is behaving abnormally.

Figure 4:
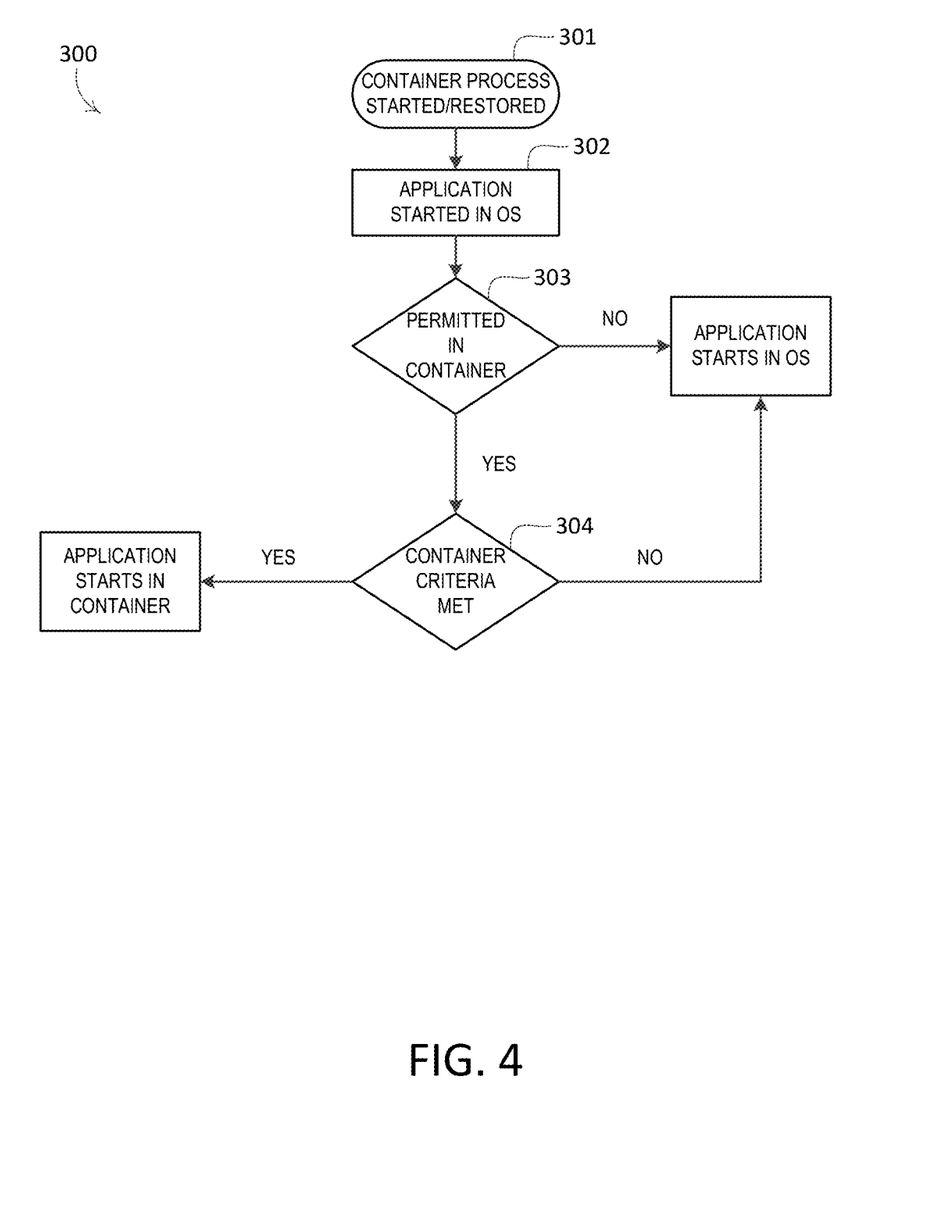
FIG. 4 illustrates a flowchart of an example method for determining whether an application is to run in a sandbox environment or in non-sandbox memory space of the host computer system.

The host computer system or the sandbox firewall process itself may be configured to dictate whether an application or process runs in a sandbox or the remaining memory space, including the operating system, of the host computer system. For instance, as shown in FIG. 4, when a sandbox has been started or restored (at 301), the host computer system) determines that an application is to be started on the host computer system (at 302). If the application is not permitted to run in the sandbox environment based on one or more sandbox criteria ("No" at 303), the application is run in the remaining memory space, including the operating system of the host computer system. If the application is permitted to run in the sandbox environment based on the one or more sandbox criteria ("Yes" at 303 and at 304), the application is run in the sandbox environment. The criteria for determining whether an application is permitted to run in a sandbox may include which type of process is to be run, how much memory it uses, which hardware resources it attempts to access, a processing history indicating that the process is known and trusted, etc.

If the malware process was not permitted in the sandbox ("No" at 303), it may be started in the remaining memory space, including the operating system, of the host computer system. If the malware process was, for some reason, permitted to run in the container, but the container criteria were not met ("No" at 304), the process may be run (or may attempt to run) in the remaining memory space, including the operating system, of the host computer system. Accordingly, in examples, only processes that are both permitted in the sandbox (based on policies or settings) ("Yes" at 303) and meet sandbox criteria ("Yes" at 304) are permitted to run in the sandbox. This further reduces a malware process's ability to communicate and propagate. If a malware application was somehow successfully started in the sandbox environment ("Yes" at 304), the sandbox firewall would prevent any access of the malware application to the remaining memory space, including the operating system, of the host computer system.

FIG. 5 illustrates a computing environment in which a host computer system's operating system 401 receives data from a sandbox protected environment 403. If a user has initiated the data transfer (as opposed to malware or other program requesting the transfer), and if the data transfer is a permitted action, the data transfer may be permitted to travel through the sandbox firewall 402. Any communication attempts that fail to meet these criteria are blocked. This renders useless any malware attempts to transfer data out of a sandbox environment. The malware's attempts, whether originating from inside the sandbox or from the remaining memory space, including the operating system, on the host computer system (401), may not be user initiated, and as such, they may be blocked on at least these grounds. Moreover, even if the attempts were disguised to appear as if they came from a user, because they are not a permitted action, they would be blocked. Still further, any network connectivity to other devices on the connected network (e.g., 405), including trusted and untrusted networks, is monitored and protected by other protection systems, as described herein (e.g., with reference to FIG. 6).

Each of the embodiments described herein (e.g., with reference to FIGS. 2-5) may be operated in the computing environment 500 of FIG. 6. FIG. 6 illustrates a resilient network architecture solution, which protects against malware, utilizing many different security enhancements. As noted above, at least one of these security enhancements includes a sandbox 517 that uses a sandbox firewall 511. In at least one implementation, the sandbox implements web proxy authentication, which allows access to the open internet. Moreover, internet access is only permitted through the web proxy 506 using a single, sandboxed application 517 such as a browser. If requests come to the web proxy that are not properly authenticated, or are from a non-sandboxed application, the requests may be denied. If requests come to the web proxy listing a network destination that has been identified on a blacklist as a forbidden destination, the requests may be blocked. On the other hand, if requests come to the web proxy listing a network destination that is identified on a whitelist as preapproved, those requests may be allowed through the web proxy.

Still further, the host computer system 510 may be location-aware. As such, the host computer system 510 may determine when it is on a protected or trusted network (e.g., at 516), and when it is on an untrusted network (e.g., at 502). When the host computer system 510 is on an untrusted network (e.g., at 502), only sandboxed browsing is permitted. Moreover, host-based firewall protection is increased. Even when the host computer system 510 is on a trusted network 516, the host computer system operating system 513 may be prevented from openly communicating with other host computer systems such as 514 and 515 by a host-based firewall ingress policy on host computer systems 514 and 515. This is illustrated on the example host computer system 510 by item 512.

Similarly, the host computer system operating system 513 may be allowed or prevented from communicating with server 508 through trusted network 509. If, for example, a user or malicious program tries to communicate out to the internet through the trusted network 509 using non-web-based protocols, the request may be blocked by the border firewall 505 (or by a perimeter firewall). If, for example, a request leaving the host computer system, uses web protocol requests, the request may be rerouted by the router 507 to the web proxy 506, where the request may be dropped. Authenticated requests sent from a sandboxed browser may be sent from the web proxy 506 through the border firewall 505 to the border router 504 where they are routed to trusted servers (e.g., 501) or to untrusted servers (e.g., 503). The border firewalls are configured to only allow internet access to whitelist-approved websites, or to allow access via the web proxy 506. Access to the internet from other (e.g., all other) devices, except predetermined devices via predetermined network ports are automatically dropped.

All externally bound requests using web protocols from internal host computer system's non-sandbox memory space, including the operating system, are automatically directed to the web proxy on a specific port, such as 4321. In some cases, the location of this "redirection" is a router just prior to the border firewall (e.g., router 507). With the exception of whitelisted traffic, traffic received by the web proxy on this specific port, such as 4321, is automatically dropped.

In at least one implementation, non-whitelisted access to the web proxy requires authentication credentials, to which malware programs would not have access. Utilization of the web proxy to gain internet access may be provided via a secondary port, such as 1234. All improperly authenticated or unauthenticated traffic received on this secondary port would be automatically dropped. Authenticated access to the web proxy is available (e.g., only available) using a sandboxed application, such as a browser. Authentication credentials may be encrypted and stored locally or in other network accessible locations.

Authentication credentials, encrypted or otherwise, may be stored in encrypted configuration files, which may be stored locally or in other network accessible locations. These configuration files, which may or may not be encrypted, that store the authentication credentials, which may or may not be encrypted, are loaded on startup or restart of the sandbox. The sandbox firewall 511 prevents non-allowed data or data requests between the sandbox and the remaining memory space, including the operating system. All other connectivity between the sandbox and the remaining memory space, including the operating system, of the host computer system is blocked.

Within the network, outbound web-based internet traffic is allowed (e.g., only allowed) through the tightly-controlled web proxy, greatly limiting the ability for malware to reach outside the network. This leads to a much quieter network that is easier to maintain and monitor. Moreover, requests that appear out of the ordinary are easy to identify and stop, as they likely come from a malicious or unknown program.

In at least one embodiment, non-allowed data or data requests comprises any data or data requests that are not explicitly whitelisted and/or allowed by user action. For example, in at least one embodiment, applications, such as a browser, that run within the container may require access to certain system resources (e.g., memory management APIs, user-interface APIs, etc.). Each of these resources are listed in a whitelist such that the application is able to properly function. In contrast, with data and data requests that are not in a whitelist or specifically denied, such as on a blacklist, the sandbox firewall blocks the data or data request.

By being location aware, a host computer system 510 may determine whether it is connected to a secured network 516 (e.g., "on" network) or connected to an "unsecure" network 502 (e.g., "off" network). The host-based firewall permits sandboxed browser traffic to exit the host computer system when it is "off" network according to policies and settings governing when such traffic is permitted. The host-based firewall also permits authorized virtual private network (VPN) clients to exit the host computer system when "off" network. The host-based firewall drops other (e.g., all other) traffic including malware trying to exit the host computer system when it is "off" network.

The sandbox firewall may create (e.g., automatically create) a browser process within a sandboxed environment for destinations considered "untrusted," regardless of the location of the host computer system. The sandbox firewall may also be configured to automatically create a browser process within memory space of the host computer system that is not being utilized for connectivity to "untrusted" destinations regardless of the location of the host computer system.

In cases where a sandbox environment is compromised, the sandbox environment may be reverted to a known good image, thereby removing any malware included therein. This may happen on a periodic basis (e.g., daily), or by user request, or if the container is considered infected. As such, any malware would need to re-enter the network, increasing the likelihood that the malware may be detected. When a malware application attempts to communicate with other host computer systems in the network (i.e., lateral movement), these attempts are prevented by a host-based firewall that refuses incoming (e.g., all incoming) connections. The host-based firewall may make exceptions, such as incoming connections for whitelisted destinations, and/or preapproved devices on preapproved ports. In any case, the malware may attempt to exit through the web proxy or directly through a firewall, such as a border firewall, but traffic from internal host computer systems may be dropped by these devices. A remaining (e.g., the only remaining) exit path for malware is to exit through a sandboxed application, but the sandbox firewall refuses automated (e.g., all automated) connections into or out of the sandbox.

Because the embodiments herein may be location-aware, laptops, tablets and other mobile devices are protected both "on" and "off" secure network configurations. Should an attacker gain access to a host computer system with malware designed to wait for an unfiltered internet connection, the host-based firewall may still block the malware from connecting to the internet, hence protecting the data. Employees are still able to browse the internet through the sandboxed browser.

On occasions where a direct internet connection is required, a whitelist exception process may allow for such a connection. However, even these types of access may be tightened using configurable access controls. For instance, an administrator may limit the access to a third or fourth level domain, limit the address to the employees who require it and/or add a user agent string so that person or application (e.g., only) has access.

The embodiments described herein may be implemented on various types of computing systems. As noted above, these computing systems may, for example, be mobile phones, electronic appliances, laptop computers, tablet computers, wearable devices, desktop computers, mainframes, and the like. As used herein, the term "computing system" includes any referenced "host computer system", device, system, or combination thereof that includes at least one processor, and a physical and tangible computer-readable memory capable of having thereon computer-executable instructions that are executable by the processor. A computing system may be distributed over a network environment and may include multiple constituent computing systems (e.g., a cloud computing environment). In a cloud computing environment, program modules may be located in both local and remote memory storage devices.

As described herein, a computing system may include communication channels that allow the computing system to communicate with other message processors over a wired or wireless network. Such communication channels may include hardware-based receivers, transmitters or transceivers, which are configured to receive data, transmit data or perform both. Embodiments described herein also include physical computer-readable media for carrying or storing computer-executable instructions and/or data structures. Such computer-readable media may be any available physical media that may be accessed by a general-purpose or special-purpose computing system.

Still further, system architectures described herein may include a plurality of independent components that each contribute to the functionality of the system as a whole. This modularity allows for increased flexibility when approaching issues of platform scalability and, to this end, provides a variety of advantages. System complexity and growth may be managed more easily through the use of smaller-scale parts with limited functional scope. Platform fault tolerance is enhanced through the use of these loosely coupled modules. Individual components may be grown incrementally as business needs dictate. Modular development also translates to decreased time to market for new functionality. New functionality may be added or subtracted without impacting the core system.

Accordingly, methods, systems and computer program products are provided which select an appropriate firewall policy based on location. Moreover, methods, systems and computer program products are provided which provide a protected sandbox environment with segregated processes and memory space. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:
1. A host computer system configured to connect to a network, wherein the host computer system comprises:
    a processor configured to:
        implement a host operating system that enables operation of a workspace, wherein the workspace uses a first memory space;
        implement a sandboxed computing environment that uses the host operating system and a second memory space;

isolate, using an internal isolation firewall that uses the host operating system, the sandboxed computing environment that uses the host operating system and the second memory space from the workspace enabled by the host operating system that uses the first memory space, wherein the internal isolation firewall is configured to monitor data being communicated between the sandboxed computing environment that uses the host operating system and the workspace enabled by the host operating system;

determine, using one or more environmental indicators, a relative location of the host computer system; and select a firewall policy based on the relative location of the host computer system, wherein the firewall policy comprises a configuration to apply to one or more of the internal isolation firewall or a host-based firewall.

2. The host computer system of claim 1, wherein the one or more environmental indicators comprise an internet protocol (IP) address assigned to the host computer system, the network to which the host computer system is connected, a network identifier, a router to which the host computer system is connected, a border firewall to which the host computer system is connected, available wired or wireless connections, an indication of latitude and longitude coordinates for the host computer system from a global positioning system (GPS) radio, or a triangulated position of the host computer system based on wireless signals received.

3. The host computer system of claim 1, wherein when the relative location of the host computer system is a known network, the firewall policy is a preconfigured firewall policy associated with the known network.

4. The host computer system of claim 1, wherein when the relative location of the host computer system is an unknown network, the firewall policy is a default firewall policy associated with unknown networks, the default firewall policy comprising the host-based firewall being configured to block incoming and outgoing traffic from the workspace of the host computer system.

5. The host computer system of claim 1, wherein the processor is further configured to:

receive a request to transfer the data from the workspace to the sandboxed computing environment;

when the request is initiated by a user of the host computer system and is a permitted action, allow the transfer of the data to the sandboxed computing environment; and when the request is non-user initiated or is not a permitted action, block the transfer of the data to the sandboxed computing environment.

6. The host computer system of claim 1, wherein the processor is further configured to:

receive a request to transfer data from the sandboxed computing environment to the workspace;

when the request is initiated by a user of the host computer system and is a permitted action, allow the transfer of the data to the workspace; and when the request is non-user initiated or is not a permitted action, block the transfer of the data to the workspace.

7. The host computer system of claim 1, wherein the processor is further configured to implement a monitoring process that monitors the internal isolation firewall to identify when the internal isolation firewall is not operating or abnormal operation of the internal isolation firewall.

8. The host computer system of claim 1, wherein the internal isolation firewall is configured to allow a predetermined set of programs and processes to operate within the sandboxed computing environment.

9. The host computer system of claim 1, wherein the processor is further configured to communicate, using a set of one or more applications or processes operating on the sandboxed computing environment, with untrusted network destinations via a proxy device.

10. The host computer system of claim 1, wherein the sandboxed computing environment is enforced by a sandbox container process that enables the internal isolation firewall.

11. A method comprising:

implementing a host operating system that enables operation of a workspace on a host computer system, wherein the workspace uses a first memory space;

implementing a sandboxed computing environment that uses the host operating system and a second memory space;

isolating, using an internal isolation firewall that uses the host operating system, the sandboxed computing environment that uses the host operating system and the second memory space from the workspace enabled by the host operating system that uses the first memory space, wherein the internal isolation firewall is configured to monitor data being communicated between the sandboxed computing environment that uses the host operating system and the workspace enabled by the host operating system;

determining, using one or more environmental indicators, a relative location of the host computer system; and selecting a firewall policy based on the relative location of the host computer system, the firewall policy comprising a configuration to apply to one or more of the internal isolation firewall or a host-based firewall.

12. The method of claim 11, wherein the one or more environmental indicators comprise an internet protocol (IP) address assigned to the host computer system, a network to which the host computer system is connected, a network identifier, a router to which the host computer system is connected, a border firewall to which the host computer system is connected, available wired or wireless connections, an indication of latitude and longitude coordinates for the host computer system from a global positioning system (GPS) radio, or a triangulated position of the host computer system based on wireless signals received.

13. The method of claim 11, wherein when the relative location of the host computer system is a known network, the firewall policy is a preconfigured firewall policy associated with the known network.

14. The method of claim 11, wherein when the relative location of the host computer system is an unknown network, the firewall policy is a default firewall policy associated with unknown networks, and wherein the default firewall policy comprises configuring the host-based firewall to block incoming and outgoing traffic from the workspace of the host computer system.

15. The method of claim 11, further comprising:

receiving a request to transfer the data from the workspace to the sandboxed computing environment;

when the request is initiated by a user of the host computer system and is a permitted action, allowing the transfer of the data to the sandboxed computing environment; and when the request is non-user initiated or is not a permitted action, blocking the transfer of the data to the sandboxed computing environment.

16. The method of claim 11, further comprising:
receiving a request to transfer data from the sandboxed computing environment to the workspace;
when the request is initiated by a user of the host computer system and is a permitted action, allowing the transfer of the data to the workspace; and
when the request is non-user initiated or is not a permitted action, blocking the transfer of the data to the workspace.

17. The method of claim 11, further comprising implementing a monitoring process that monitors the internal isolation firewall to identify when the internal isolation firewall is not operating or abnormal operation of the internal isolation firewall.

18. The method of claim 11, further comprising the internal isolation firewall allowing a predetermined set of programs and processes to operate within the sandboxed computing environment.

19. The method of claim 11, further comprising communicating, using a set of one or more applications or processes operating on the sandboxed computing environment, with untrusted network destinations via a proxy device.

20. The method of claim 11, wherein the sandboxed computing environment is enforced by a sandbox container process that enables the internal isolation firewall.

* * * * *